(12) United States Patent
Bezlepkin et al.

(10) Patent No.: US 10,718,510 B2
(45) Date of Patent: Jul. 21, 2020

(54) DEAERATOR (OPTIONS)

(71) Applicants: JOINT-STOCK COMPANY SCIENTIFIC RESEARCH AND DESIGN INSTITUTE FOR ENERGY TECHNOLOGIES ATOMPROEKT, St. Petersburg (RU); JOINT STOCK COMPANY "SCIENCE AND INNOVATIONS", Moscow (RU)

(72) Inventors: Vladimir Viktorovich Bezlepkin, St. Petersburg (RU); Anzhella Gennadievna Amelyushina, St. Petersburg (RU); Lidiya Dmitriyevna Litvinenko, St. Petersburg (RU); Vladimir Olegovich Kukhtevich, St. Petersburg (RU); Andrey Gennadievich Mitryukhin, St. Petersburg (RU); Mikhail Sergeyevich Ustinov, Kareliya (RU); Aleksey Ivanovich Kurchevskiy, St. Petersburg (RU)

(73) Assignee: Joint-Stock Company Scientific Research And Design Institute For Energy Technologies Atomproekt, Moscow (RU)

( * ) Notice: Subject to any disclaimer, the term of this patent is extended or adjusted under 35 U.S.C. 154(b) by 262 days.

(21) Appl. No.: 15/328,435

(22) PCT Filed: Jul. 24, 2015

(86) PCT No.: PCT/RU2015/000466
§ 371 (c)(1),
(2) Date: Jan. 23, 2017

(87) PCT Pub. No.: WO2016/013961
PCT Pub. Date: Jan. 28, 2016

(65) Prior Publication Data
US 2017/0211804 A1    Jul. 27, 2017

(30) Foreign Application Priority Data

Jul. 24, 2014 (RU) .................. 2014130847

(51) Int. Cl.
*B01D 19/00* (2006.01)
*F22D 1/50* (2006.01)
(Continued)

(52) U.S. Cl.
CPC ........... *F22D 1/50* (2013.01); *B01D 19/0021* (2013.01); *C02F 1/20* (2013.01); *F22B 37/002* (2013.01); *F22D 1/30* (2013.01); *C02F 2103/023* (2013.01)

(58) Field of Classification Search
CPC ... B01D 19/00–0495; F22D 1/30; F22D 1/50; F22D 1/28; C02F 1/20; C02F 2103/023; F22B 37/002–007
(Continued)

(56) References Cited

U.S. PATENT DOCUMENTS 3,347,023 A * 10/1967 Scott .................. B01D 19/0047
96/158

OTHER PUBLICATIONS

International Search Report issued to PCT Application No. PCT/RU2015/000466 dated Nov. 12, 2015.
(Continued)

*Primary Examiner* — T. Bennett McKenzie
(74) *Attorney, Agent, or Firm* — Hackler Daghighian Martino & Novak

(57) ABSTRACT

The group of inventions refers to heat exchange machinery. The device includes a tank with an outlet fitting and a steam source, a deaerator column with a cover and water inlet and vapor blowdown fittings located on the same, containing lower and upper deaeration sections. Each section includes pressure and distribution trays forming a jet chamber in the space between them, and random element packing. Deaeration sections are separated by a hydraulic seal formed by the edge of the upper section pressure tray and the projection connected to the deaerator column cover. The water inlet and (Continued)

vapor blowdown fittings are located inside the hydraulic seal projection with openings in it. The lower edges of the openings are located higher than the upper edge of the hydraulic seal by a value exceeding the sum of overflow height of the coolant over the edge and hydraulic resistance of the hydraulic seal channel. The total cross section of the openings is determined by equality of steam pressure in the blowdown fitting and in the space inside the hydraulic seal projection. This increases the operation reliability.

3 Claims, 5 Drawing Sheets

(51) Int. Cl.
*F22B 37/00* (2006.01)
*F22D 1/30* (2006.01)
*C02F 1/20* (2006.01)
*C02F 103/02* (2006.01)

(58) Field of Classification Search
USPC .................................................. 96/155–220
See application file for complete search history.

(56) References Cited

OTHER PUBLICATIONS

Written Opinion of the International Search Authority issued to PCT Application No. PCT/RU2015/000466 dated Nov. 12, 2015.

* cited by examiner

DEAERATOR (OPTIONS)

INCORPORATION BY REFERENCE TO RELATED APPLICATIONS

This application is a U.S. national stage entry of, and claims priority to, PCT Application No. PCT/RU2015/000466, filed on Jul. 24, 2015 (International Publication No. WO/2016/013961), which claims priority to RU 2014130847, filed on Jul. 24, 2014, all of which are hereby incorporated herein by reference in their entirety and are to be considered a part of this specification.

BACKGROUND OF THE INVENTION

Field of the Invention

A group of inventions refers to heat exchange machinery, thermal deaerators in particular, and can be used in power units of thermal and nuclear power plants, and in boilers. The technical solutions claimed are classified as thermal deaerators with random element packing.

Description of the Related Art

The main fields of application are makeup and boron control systems of nuclear power plants (NPPs) with water-cooled water-moderated power reactors.

The operation of makeup and boron control systems is characterized by the fact that most of time coolant is supplied for deaeration from the primary coolant circuit at a low flow rate (about 5 tons per hour). However, the flow rate of the coolant supply to the deaerator can increase periodically 10 to 15 times (up to 70 tons per hour), depending on the unit operation mode.

This is why the deaerator usually has a two-section deaerator column where the first section ensures deaeration at a low flow rate (5 to 7 t/h) while the second section is brought into operation in case of a flow rate increase.

The experience of operation of such deaerators at NPPs shows that and increase in load leads to flooding of the deaerator column. This is a process when the steam necessary to heat the coolant up to the saturation point (temperature) and form a blowdown medium moves upwards entraining the coolant to the vapor.

It is extremely dangerous for NPPs as the vapor flows to the hydrogen recombination system while the coolant with high hydrogen content gets into the recombination systems rendering it inoperable. Failure of the recombination system can cause the detonating mixture to explode.

Hydrodynamic stability calculations of the deaerator column (determination of the flooding margin) using available methods (e. g. technical guideline "Calculation and Design of Thermal Deaerators", RTM 108.030.21-78, Rev. 1) gave no answer to the question about the cause of flooding.

It required a deeper analysis of operation of individual column assemblies and the entire deaerator to determine the causes of deaerator flooding and find a solution ensuring reliable operation of the deaerator in all operation mode, including transients.

A deaerator that includes a column with random elements is disclosed (see Oliker I. I., Permyakov V. A. "Thermal Deaeration of Water at Thermal Power Plants", Leningrad, Energy, 1971, pp. 31 to 35).

The column of the above deaerator has a split body with a cover, a water distributor consisting of a perforated tray, a packed bed, and a steam distribution header. Nozzles are provided in the column for inlet of water streams, inlet of steam and outlet of vapor.

The disadvantage of this deaerator is a limited range of load variation determined by only one section. As the load drops sharply as compared to the design value, the water layer above the water distributor becomes low enough not to cover it completely, providing for "break out" of heating steam into the water distributor while flooding conditions occur during a sharp increase in the load.

Thus, this deaerator ensures reliable operation in a relatively narrow range of loads.

A sectioned deaerator column is disclosed containing a vertical cylinder body mounted installed on a deaerated water storage tank, a water and steam drainage device, a deaerated water spray nozzle, and an evaporating channel (see patent RU No. 95654, C02F 1/20, 2010).

The device also includes an open bucket for intake of deaerated water that forms a hydraulic seal with water drain and lifting ducts, and the area of steam contact with the sprayed water is divided throughout its height into two sectors with independently controlled nozzles.

This device allows for control of load variation over a wide range by means of separation of the jet chamber.

The device disadvantages are:
necessity to control the flow rate of each nozzle;
increase in the deaerated water flow range requires more sections, leading to an increase in the mass and size parameters of the deaerator column;
the coolant heating and deaeration processes are based on the straight-through arrangement that is less intensive than the counterflow one;
only the jet part is used while the random packing ensures a higher intensity of the process; and
bottom vapor outlet can result in water ingress in the blowdown.

A deaerator for makeup and boron control systems of NPPs with water-cooled water-moderated power reactors is technically the closest to the claimed solution (see Fomin M. P., Popik V. V. "Operation Adjustment of the Deaerator of the Primary Circuit Feed-and-Bleed System with Controlled Leakage and Recombination Systems", collection of abstracts of the $3^{rd}$ International Scientific and Technical Conference "NPP Commissioning", Moscow, Apr. 28-29, 2014, pp. 56-57).

The device contains a deaerated coolant storage tank with an outlet fitting containing the steam source (heat exchanger). The tank has a deaerator column mounted on it, with two deaeration sections located one above the other consisting of a pressure tray and a distribution tray, the area between them forming a jet chamber, and random element packing in each section.

Deaeration sections are separated by a hydraulic seal formed by the edge of the upper section pressure tray and the projection connected to the column cover. The column cover has a blowdown outlet fitting and one or several inlet fittings for coolant supply to the deaerator. All fittings are inside the hydraulic seal projection.

The disadvantage of this device is its low reliability, since as the deaerator operates, water flow in the blowdown and disables the recombination system, which may result in explosions.

SUMMARY OF THE INVENTION

The technical result of the claimed solution lies in increased reliability of deaerator operation by exclusion of flooding and jetting into blowdown when the deaerator load is changed by times or more by prevention of evacuation of the upper part of the deaerator column in stationary and transient modes of operation.

To achieve the above technical result, the deaerator (option 1) including a tank with an outlet fitting and a steam source, a deaerator column with a cover mounted on the tank with fittings for water inlet and vapor blowdown located on it, containing lower and upper deaeration sections each having pressure and distribution trays installed so as to form a jet chamber in the area between them, and random element packing, wherein deaeration sections are separated by a hydraulic seal formed by the edge of the upper section pressure tray and the projection connected to the column cover, with water inlet and vapor blowdown fittings located inside the hydraulic seal projection which, according to the invention, has openings the lower edges of which are located higher than the upper edge of the hydraulic seal by the value exceeding the sum of overflow height of the coolant over the hydraulic seal edge and hydraulic resistance of the hydraulic seal channel, while the total cross section of the openings is determined by the equality of steam pressure in the blowdown fitting and in the area inside the hydraulic seal projection.

To achieve the above technical result, the deaerator (option 2) including a tank with an outlet fitting and a steam source, a deaerator column with a cover mounted on the tank with fittings for water inlet and vapor blowdown located on it, containing lower and upper deaeration sections each having pressure and distribution trays installed so as to form a jet chamber in the area between them, and random element packing, wherein deaeration sections are separated by a hydraulic seal formed by the edge of the upper section pressure tray and the projection connected to the column cover, with water inlet and vapor blowdown fittings located inside the hydraulic seal projection which, according to the invention, has openings the lower edges of which are located higher than the upper edge of the hydraulic seal by the value exceeding the sum of overflow height of the coolant over the hydraulic seal edge and hydraulic resistance of the hydraulic seal channel, while the total cross section of the openings is determined by the equality of steam pressure in the blowdown fitting and in the area inside the hydraulic seal projection, and an additional steam blowdown fitting is located outside of the hydraulic seal projection on the cover of the deaerator column.

To achieve the above technical result, the deaerator (option 3) including a tank with an outlet fitting and a steam source, a deaerator column with a cover mounted on the tank with fittings for water inlet and vapor blowdown located on it, containing lower and upper deaeration sections each having pressure and distribution trays installed so as to form a jet chamber in the area between them, and random element packing, wherein deaeration sections are separated by a hydraulic seal formed by the edge of the upper section pressure tray and the projection connected to the column cover, with water inlet and vapor blowdown fittings located inside the hydraulic seal projection which, according to the invention, has openings the lower edges of which are located higher than the upper edge of the hydraulic seal by the value exceeding the sum of overflow height of the coolant over the hydraulic seal edge and hydraulic resistance of the hydraulic seal channel, while the total cross section of the openings is determined by the equality of steam pressure in the blowdown fitting and in the area inside the hydraulic seal projection, and an additional steam blowdown fitting is located outside of the hydraulic seal projection on the cover of the deaerator column, while the upper deaeration section is connected directly to the tank by means of a connection pipe run all the way through the lower deaeration section.

BRIEF DESCRIPTION OF THE DRAWINGS

Features, aspects and advantages are described below with reference to the drawings, which are intended to illustrate but not to limit the invention.

Figure 1:
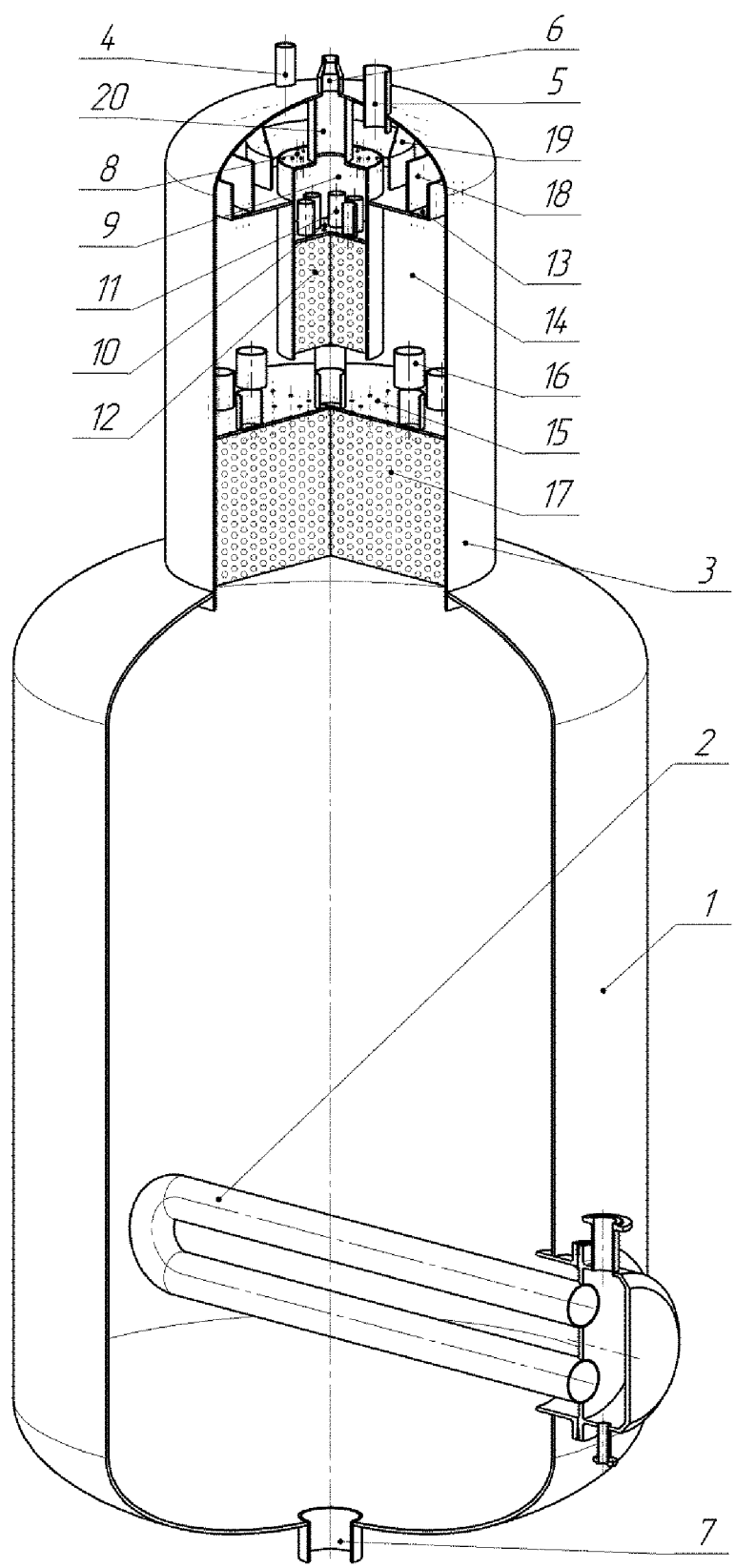
FIG. 1 shows the deaerator schematics (option 1).
Figure 2:
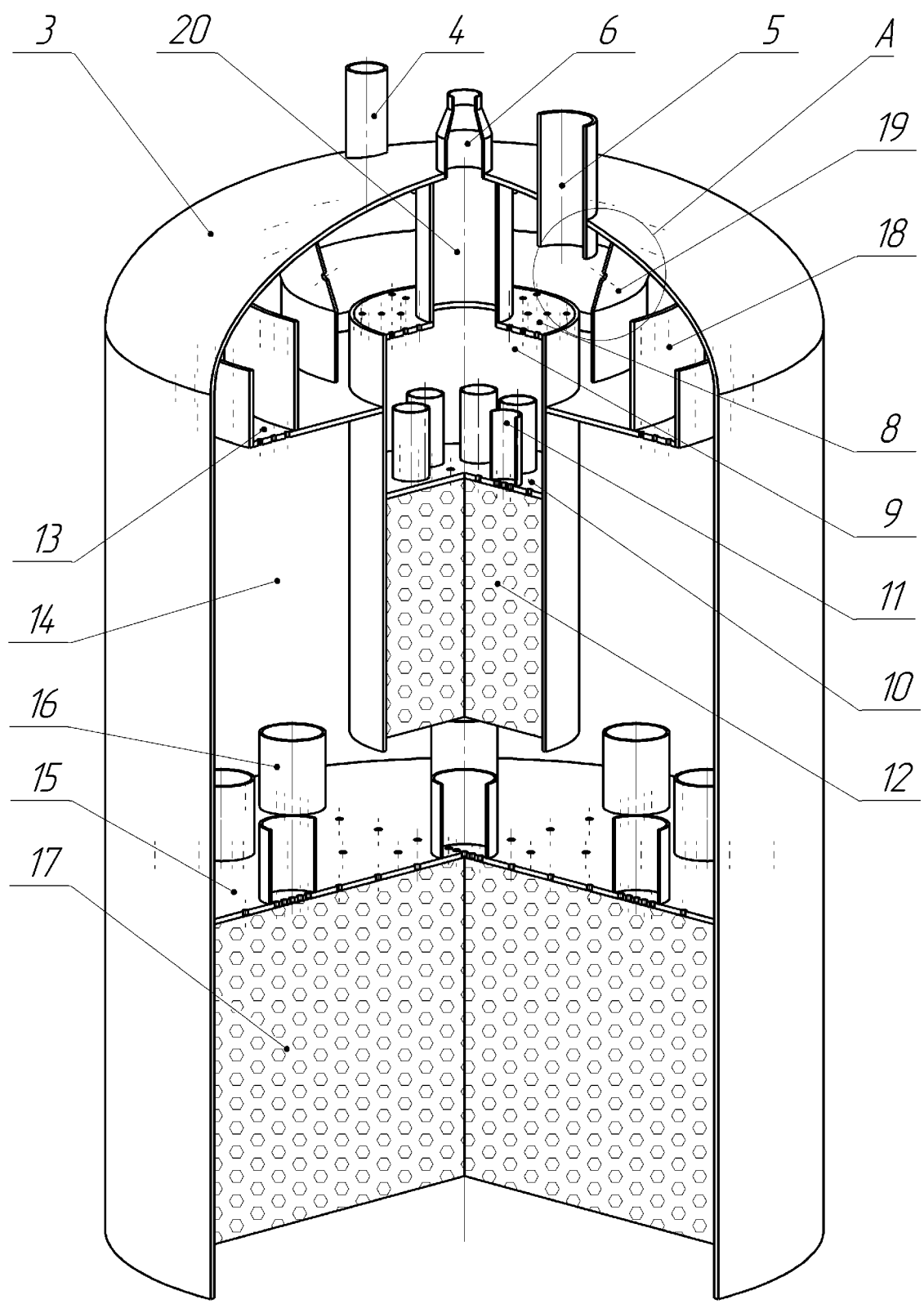
FIG. 2 shows the deaerator column as per option 1.
Figure 3:
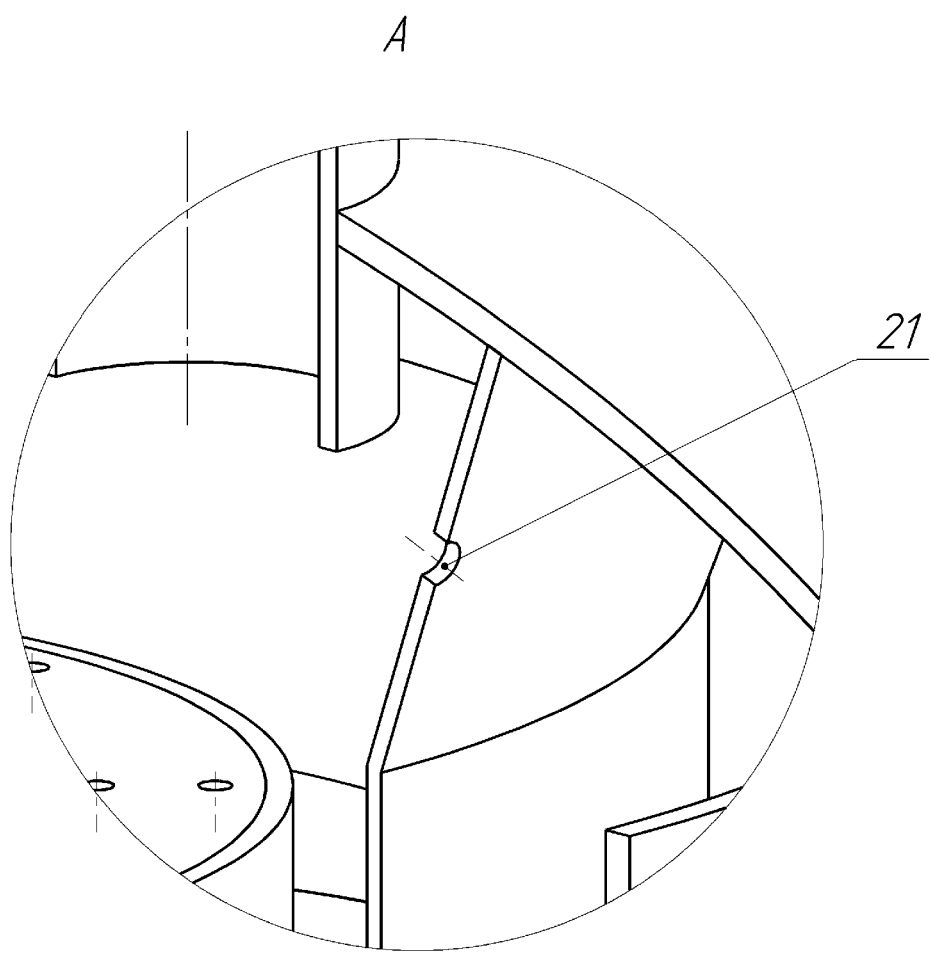
FIG. 3 includes section A showing the hydraulic seal projection with an opening (option 1).

It should be noted that the drawings show only those parts that are necessary to understand the concept of the claim, omitting the associated equipment well known to the specialists in this field.

The following items are shown in the drawings:

1—tank;
2—steam source;
3—deaerator column;
4, 5—water supply fittings;
6—blowdown fitting;
7—outlet fitting;
8—pressure tray of the first deaeration section;
9—jet part of the first deaeration section;
10—distribution tray of the first deaeration section;
11—buckets of the distribution tray of the first deaeration section;
12—random element packing of the first deaeration section;
13—pressure tray of the second deaeration section;
14—jet part of the second deaeration section;
15—distribution tray of the second deaeration section;
16—buckets of the distribution tray of the second deaeration section;
17—random element packing of the second deaeration section;
18—hydraulic seal edge;
19—hydraulic seal projection;
20—partition;
21—openings in the hydraulic seal projection;
22—additional blowdown fitting for option 2; and
23—additional connection pipe for option 3.

DETAILED DESCRIPTION OF THE PREFERRED EMBODIMENT

The deaerator (option 1) consists of a tank 1 in the form of a cylinder steel vessel with elliptical bottom and cover. The lower part of the tank 1 houses the steam source 2 which is a surface heat exchanger made of smooth steel pipes heated by the steam from turbine extraction (FIG. 1).

The tank 1 houses a deaerator column 3 consisting of two series-parallel deaeration sections with random elements.

The column cover 3 is equipped with water supply fittings 4 and 5 and a blowdown fitting 6. The lower part of the tank 1 has an outlet fitting 7.

The first deaeration section includes the following elements located one above another: a pressure tray 8, a jet part 9, a distribution tray 10 (perforated) with buckets 11 mounted on it, and a packing 12 with random elements such as omega-shaped element in this specific application example.

The second deaeration section is located under the first one along the vertical axis of the device. It includes the same elements as the first section: a pressure tray 13, a jet part 14, a distribution tray 15 (perforated) with buckets 16 mounted on it, and a packing with random elements 17.

The first and the second deaeration sections are separated by a hydraulic seal formed by the edge 18 and the projection 19. The edge 18 top is located above the pressure tray 8 of the first deaeration section. The projection 19 is designed so that its lower edge is below the pressure tray 8 of the first deaeration section, and the upper edge is connected to the column 3 cover so that inlet fittings 4 and 5 are inside the projection 19.

The jet part 9 of the first deaeration section is connected to the blowdown fitting 6 by means of a partition 20 running through the pressure tray 8 and attached to the column 3 cover in the upper part. Small vent holes are located in the points of attachment of the projection 19 and the partition 20 to the column 3 cover.

The projection 19 has openings 21 in it located higher than the edge 18 top by a value exceeding the sum of overflow height of the coolant over the edge 18 and hydraulic resistance of the hydraulic seal channel.

The total cross section of the openings 21 is determined by equality of steam pressure in the blowdown fitting 6 and in the space inside the projection 19.

The deaerator (option 1) operates as follows.

The source stream of coolant (circuit blowdown) flows into the deaerator column 3 through the water inlet fitting 4 at a constant flow rate. As soon as the coolant is in the deaerator, it begins to be heated by steam condensation. Besides, the steam condenses on the coolant mirror generated on the pressure tray 8 of the first deaeration section. Through the openings in the pressure tray 8, the coolant enters the jet part 9 of the first deaeration section where it is heated to the saturation point by the steam generated in the steam source 2.

The height of the edge 18 of the hydraulic seal is calculated so that the coolant level on the pressure tray 8 of the first deaeration section would be lower, i.e. the whole coolant amount enters the first deaeration section only.

After heating in the jet part 9 of the first deaeration section, the coolant condenses some of the steam and flows to the distribution tray 10 of the first deaeration section. Buckets 11 mounted on it serve to let the steam pass into the jet part 9, which is why their height should exceed the potential level of coolant and condensate on the distribution tray 10 of the first deaeration section.

Through the perforation of the distribution tray 10 of the first deaeration section, the coolant flows into the packing 12 with random elements where its final heating to the saturation state and degassing occurs. Random elements ensure the efficiency of degassing as the water spreads over their surface in a thin film, thus increasing the contact area between water and steam, meanwhile leaving a large free cross section between the elements (due to their randomness) to let the steam go through.

Then, the coolant and the condensate generated as a result of its heating flow through the second deaeration section to the tank 1 and further back to the circuit through the outlet fitting 7. The gases emitted from the coolant in the mixtures with some steam exit the deaerator through the partition 20 into the blowdown fitting 6.

When additional coolant flow (e.g., makeup) is supplied to the deaerator through the inlet fitting 5 and/or the flow rate through the inlet fitting 4 increases significantly, the entire coolant flow through the pressure tray 8 of the first deaeration section into the first section is discontinued. The level on the tray 8 starts to increase exceeding the height of the edge 18 of the hydraulic seal and the coolant starts to flow over to the pressure tray 13 of the second deaeration section.

Thus, higher coolant flow rates bring both deaeration sections to operation. The flow rate through the first deaeration section is determined by the height of the edge 18 of the hydraulic seal, the rest of the coolant flows to the tray 13 of the second deaeration section and then to the jet part 14, the distribution tray 15 and in the packing 17 with random elements.

The steam of the source 2 moves towards the coolant stream: through the packing 17 of the second deaeration section, through the buckets 16 into the jet part 14, then it partially flows to the first section and the rest heats up the coolant in the jet part 14 of the second deaeration section. The gases emitted from the coolant passing through the second deaeration section, from the volume of the jet part 14 exit to the blowdown fitting 6 through all elements of the first section (items 12, 10, 11, 9, 20).

To ensure reliable operation of the deaerator, it is important to prevent flooding during its operation, in both stationary and transient modes.

This requires correct selection of cross sections of the random elements packings 12 and 17, and the pressure balance in all parts of the column 3.

The packing cross sections shall be selected in compliance with regulatory documents (technical guideline "Calculation and Design of Thermal Deaerators" RTM 108.030.21-78, Rev. 1).

If the flow cross section of the set of openings 21 in the projection 19 is insufficient, the volume of the column 3 limited by the projection 19 will be evacuated. Evacuation of the jet part 8 of the first deaeration section will follow making the level of coolant increase. When the coolant level exceeds the height of the bucket 11 on the distribution tray 10 of the first deaeration section, the cross section for blowdown flow is reduced causing flooding with coolant entrained to the fitting 6.

The cross section of the set of openings 21 in the projection 19 shall be selected based on the following condition: pressure differential on the partition wall 20 shall be zero. For this sake, it is necessary for the steam resistance pressure differential from the jet chamber 14 of the second deaeration section to the blowdown fitting 6 to be equal to the steam resistance pressure differential from the jet chamber 14 of the second deaeration section to the volume inside the projection 19.

The amount of steam that enters the jet part 14 of the second deaeration section through the buckets 16 is consumed as follows:

1. Condensing on the jets of the jet part 14.
2. Condensing on the mirror of the pressure tray 13.
3. Condensing on the coolant jets flowing from the inlet fittings 4 and 5.
4. Condensing on the mirror of the pressure tray 8.
5. Condensing in the packing 12.
6. Condensing on the distribution tray 10.
7. Condensing in the jet part 9.
8. Flowing to the fitting 6 through the partition 20 with deaeration gases.

Thus the steam flow rate that generates pressure differential between the outlet of buckets 16 of the distribution tray of the second deaeration section and the inner space of the partition 20 is formed by the steam flow condensed in the first deaeration section (items 5 to 7) and blowdown steam of the first and the second sections (item 8). Steam flow rate determining the pressure differential between the outlet of the buckets 11 and the space inside the projection 19 (i.e., outside the partition 18) is formed by the flows of items 1 to 4 and partially item 8.

The pressure differential in the openings 21 is determined by equality of these pressure differentials. If the amount of steam condensed in the volume inside the projection 18 (items 3 and 4) is known, then the required total flow cross section of the set of openings 21 can be determined that would ensure the necessary steam flow through the projection 19.

Technically, this cross section is designed as several holes of the corresponding diameter equispaced around the projection. Lest the cross section should be partially covered by the coolant on the pressure tray 8, the lower edges of the openings 21 shall be located higher than the edge 18 top of the hydraulic seal by the value exceeding the sum of overflow height of the coolant over the edge 18 and hydraulic resistance of the hydraulic seal channel.

Below is a specific case of calculation of the diameter of the openings 21, their total cross section at pressure balance in the blowdown fitting 6 and inside of the projection 19 of the hydraulic seal above the pressure tray 8 of the first deaeration section:

1. Steam condensation in the upper chamber of the deaerator column was calculated using the following method: KORSAR/I1.1. Thermal-Hydraulic Calculation Code. Calculation Method of Closing Relations and Individual Physical Phenomena of Circuit Thermal Hydraulics. Sosnovy Bor: A. P. Aleksandrov NITI, 2001, p. 147.

2. Level exceedance ensuring overflow of excessive water from the distribution tray 8 to the distribution tray 13 through the edge 18 of the hydraulic seal was calculated using the following method: A. V. Karaushev. Fluvial Hydraulics. Leningrad, Hydrometeorological Publishing House, 1969, p. 417.

Hydraulic resistance of the hydraulic seal channel was taken into account during calculation of the level.

3. Hydraulic resistance was calculated in compliance with the following publication: Idelchak I. Ye. Reference Book of Hydraulic Resistance. Moscow, Mashinostroyeniye, 1957, p. 559.

As a result, the following data were obtained for the boron control deaerator: for steam flow through the projection 19 of the hydraulic seal, it is necessary to provide for openings 21 with total cross section $F=0.0038$ m$^2$ that can be ensured by 12 openings with a diameter of 20 mm ($12\cdot\pi(20\cdot10-3)2/4=0.00377$ m$^2$).

The technical solution claimed makes it possible to prevent flooding and jetting in the blowdown when the deaerator load is changed by times or more.

The deaerator is designed with a two-section column in which the deaeration sections are divided by a hydraulic seal and the hydraulic seal projection has a set of openings with the preset total cross section ensuring pressure balance in the blowdown fitting and inside the hydraulic seal projection above the pressure tray of the first section.

This eliminates the problem of evacuation of the upper part of deaerator column and improves the device reliability.

Figure 4:
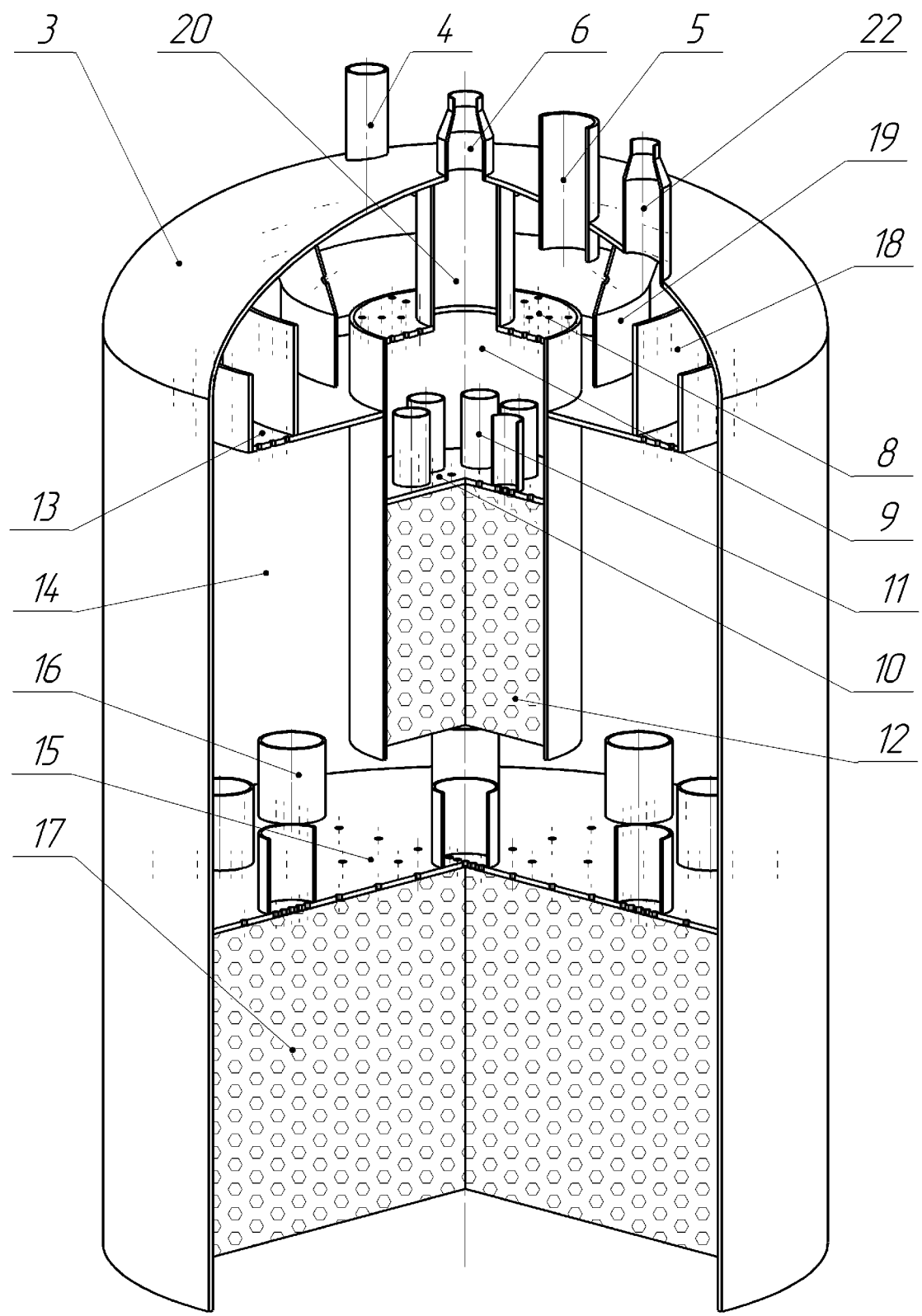
FIG. 4 shows the deaerator column with an additional blowdown fitting as per option 2.

The deaerator (option 2) consists of a tank 1 in the form of a cylinder steel vessel with elliptical bottom and cover. The lower part of the tank 1 houses the steam source 2 which is a surface heat exchanger made of smooth steel pipes heated by the steam from turbine extraction (FIG. 4).

The tank 1 houses a deaerator column 3 consisting of two series-parallel deaeration sections with random elements.

The column cover 3 is equipped with water supply fittings 4 and 5 and a blowdown fitting 6. The lower part of the tank 1 has an outlet fitting 7.

The first deaeration section includes the following elements located one above another: a pressure tray 8, a jet part 9, a distribution tray 10 (perforated) with buckets 11 mounted on it, and a packing 12 with random elements such as omega-shaped element in this specific application example.

The second deaeration section is located under the first one along the vertical axis of the device. It includes the same elements as the first section: a pressure tray 13, a jet part 14, a distribution tray 15 (perforated) with buckets 16 mounted on it, and a packing with random elements 17.

The first and the second deaeration sections are separated by a hydraulic seal formed by the edge 18 and the projection 19. The edge 18 top is located above the pressure tray 8 of the first deaeration section. The projection 19 is designed so that its lower edge is below the pressure tray 8 of the first deaeration section, and the upper edge is connected to the column 3 cover so that inlet fittings 4 and 5 are inside the projection 19.

The jet part 9 of the first deaeration section is connected to the blowdown fitting 6 by means of a partition 20 running through the pressure tray 8 and attached to the column 3 cover in the upper part. Small vent holes are located in the points of attachment of the projection 19 and the partition 20 to the column 3 cover. The projection 19 has openings 21 in it located higher than the edge 18 top by a value exceeding the sum of overflow height of the coolant over the edge 18 and hydraulic resistance of the hydraulic seal channel.

The total cross section of the openings 21 is determined by equality of steam pressure in the blowdown fitting 6 and in the space inside the projection 19.

The deaerator as per option 2 (FIG. 4) contains an additional blowdown fitting 22 located on the cover of the deaerator column outside of the space limited by the hydraulic seal projection 19.

The deaerator (option 2) operates as follows.

The source stream of coolant (circuit blowdown) flows into the column 3 through the water inlet fitting 4 at a constant flow rate. As soon as the coolant is in the deaerator, it begins to be heated by steam condensation. Besides, the steam condenses on the coolant mirror generated on the pressure tray 8 of the first deaeration section. Through the openings in the pressure tray 8, the coolant enters the jet part 9 of the first deaeration section where it is heated to the saturation point by the steam generated in the steam source 2.

The height of the edge 18 of the hydraulic seal is calculated so that the coolant level on the pressure tray 8 of the first deaeration section would be lower, i. e. the whole coolant amount enters the first deaeration section only.

After heating in the jet part 9 of the first deaeration section, the coolant condenses some of the steam and flows to the distribution tray 10 of the first deaeration section. Buckets 11 mounted on it serve to let the steam pass into the jet part 9, which is why their height should exceed the potential level of coolant and condensate on the distribution tray 10 of the first deaeration section.

Through the perforation of the distribution tray 10 of the first deaeration section, the coolant flows into the packing 12 with random elements where its final heating to the saturation state and degassing occurs. Random elements ensure the efficiency of degassing as the water spreads over their surface in a thin film, thus increasing the contact area between water and steam, meanwhile leaving a large free cross section between the elements (due to their randomness) to let the steam go through.

Then, the coolant and the condensate generated as a result of its heating flow through the second deaeration section to the tank 1 and further back to the circuit through the outlet fitting 7. The gases emitted from the coolant in the mixtures with some steam exit the deaerator through the partition 20 into the blowdown fitting 6.

When additional coolant flow (e. g., makeup) is supplied to the deaerator through the inlet fitting 5 and/or the flow rate through the inlet fitting 4 increases significantly, the entire coolant flow through the pressure tray 8 of the first deaeration section into the first section is discontinued. The level on the tray 8 starts to increase exceeding the height of the edge 18 of the hydraulic seal and the coolant starts to flow over to the pressure tray 13 of the second deaeration section.

Thus, higher coolant flow rates bring both deaeration sections to operation. The flow rate through the first deaeration section is determined by the height of the edge 18 of the hydraulic seal, the rest of the coolant flows to the tray 13 of the second deaeration section and then to the jet part 14, the distribution tray 15 and in the packing 17 with random elements.

The steam of the source 2 moves towards the coolant stream: through the packing 17 of the second deaeration section, through the buckets 16 into the jet part 14, then it partially flows to the first section and the rest heats up the coolant in the jet part 14 of the second deaeration section. The gases emitted from the coolant passing through the second deaeration section, from the volume of the jet part 14 exit to the blowdown fitting 22 passing all elements of the first section (items 12, 10, 11, 9, 20).

Therefore, the vapor of the second deaeration section does not need to pass through the first section, thus decreasing the gas flow rate through the first section and increasing the flooding margin.

For the specific embodiment, the flooding margin was determined as the relation of the limit steam velocity to the design steam velocity according to RTM 108.030.21-78.

The limit steam velocity depends on the spray rate, resistance of the packing, and a number of other parameters. The design steam velocity is the ratio of the volumetric steam flow rate to the clear opening of the packing.

The volumetric steam flow rate through the packing is formed by the flow rate of the steam required to heat the coolant up to the saturation point (this steam is condensed as the water is heated, I. e. its flow rate reduces as it moves), and of the steam flowing to blowdown entraining noncondensable gases emitted from the water during deaeration.

The flow rate of the latter is constant along the column height and is about 3 to 5% of the total value. When the second deaeration section is brought into operation, i.e. when the coolant starts to overflow the edge 18 of the hydraulic seal to the tray 13, the flow rate of blowdown steam shall be increases (3 to 4 times) in order to ensure normal blowdown.

Thus, the installation of an additional fitting 22 allows for an increase in the flooding margin in case of a load increase in the first section by approximately 15% to 20% as compared to option 1.

Figure 5:
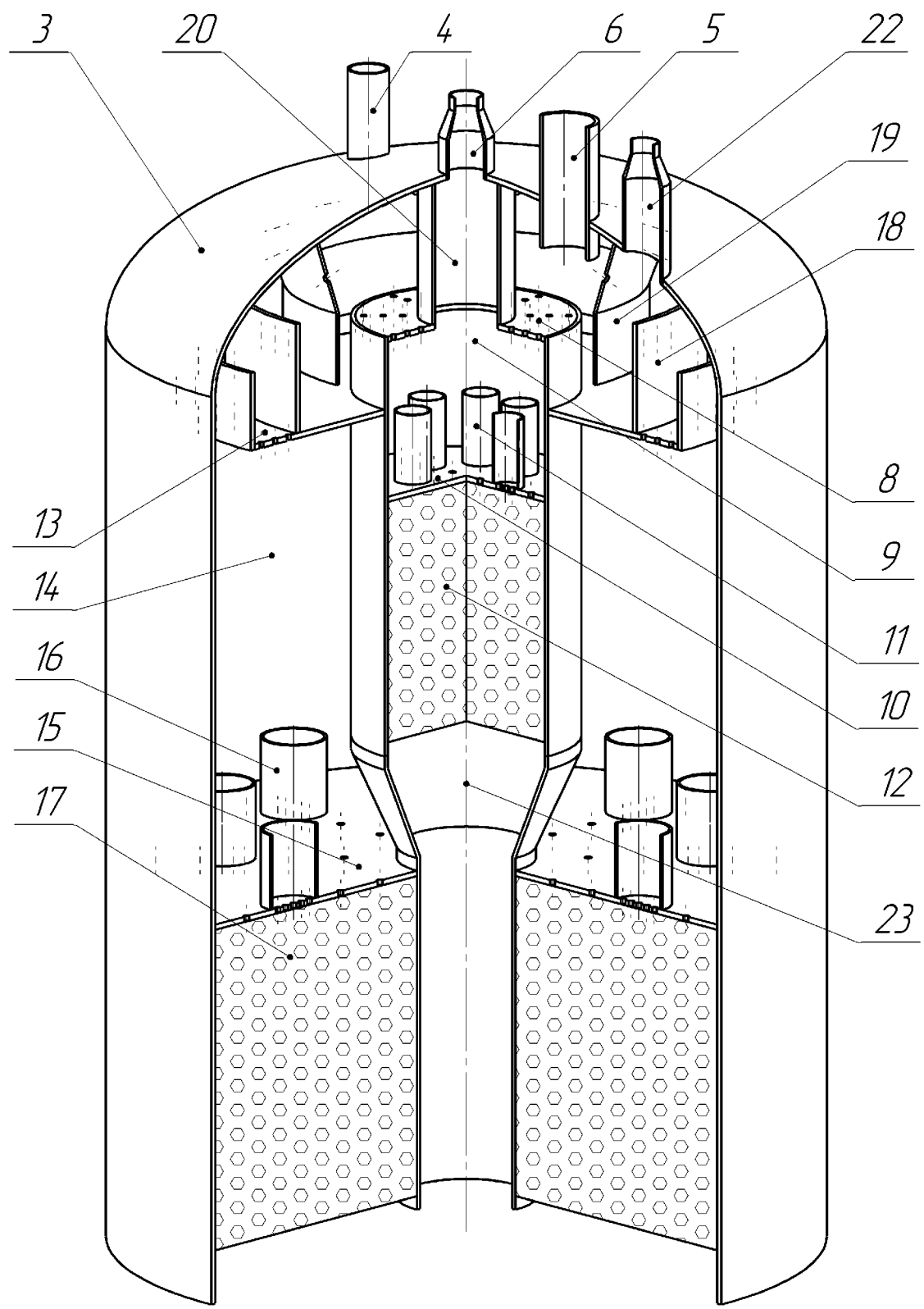
FIG. 5 shows the deaerator column with an additional connection pipe as per option 3.

The deaerator (option 3) consists of a tank 1 in the form of a cylinder steel vessel with elliptical bottom and cover. The lower part of the tank 1 houses the steam source 2 which is a surface heat exchanger made of smooth steel pipes heated by the steam from turbine extraction (FIG. 5).

The tank 1 houses a deaerator column 3 consisting of two series-parallel deaeration sections with random elements.

The column cover 3 is equipped with water supply fittings 4 and 5 and a blowdown fitting 6. The lower part of the tank 1 has an outlet fitting 7.

The first deaeration section includes the following elements located one above another: a pressure tray 8, a jet part 9, a distribution tray 10 (perforated) with buckets 11 mounted on it, and a packing 12 with random elements such as omega-shaped element in this specific application example.

The second deaeration section is located under the first one along the vertical axis of the device. It includes the same elements as the first section: a pressure tray 13, a jet part 14, a distribution tray 15 (perforated) with buckets 16 mounted on it, and a packing with random elements 17.

The first and the second deaeration sections are separated by a hydraulic seal formed by the edge 18 and the projection 19. The edge 18 top is located above the pressure tray 8 of the first deaeration section. The projection 19 is designed so that its lower edge is below the pressure tray 8 of the first deaeration section, and the upper edge is connected to the column 3 cover so that inlet fittings 4 and 5 are inside the projection 19.

The jet part 9 of the first deaeration section is connected to the blowdown fitting 6 by means of a partition 20 running through the pressure tray 8 and attached to the column 3 cover in the upper part. Small vent holes are located in the points of attachment of the projection 19 and the partition 20 to the column 3 cover. The projection 19 has openings 21 in it located higher than the edge 18 top by a value exceeding the sum of overflow height of the coolant over the edge 18 and hydraulic resistance of the hydraulic seal channel.

The total cross section of the openings 21 is determined by equality of steam pressure in the blowdown fitting 6 and in the space inside the projection 19.

The deaerator contains an additional blowdown fitting 22 located on the cover of the deaerator column outside of the space limited by the hydraulic seal projection 19.

The deaerator (option 3) contains an additional connection pipe 23 that connects the first deaeration section (packing 12) directly to the space of the storage tank 1 running through the packing 17 (FIG. 5).

The deaerator (option 3) operates as follows.

The source stream of coolant (circuit blowdown) flows into the column 3 through the water inlet fitting 4 at a constant flow rate. As soon as the coolant is in the deaerator, it begins to be heated by steam condensation. Besides, the steam condenses on the coolant mirror generated on the pressure tray 8 of the first deaeration section. Through the openings in the pressure tray 8, the coolant enters the jet part 9 of the first deaeration section where it is heated to the saturation point by the steam generated in the steam source 2.

The height of the edge 18 of the hydraulic seal is calculated so that the coolant level on the pressure tray 8 of the first deaeration section would be lower, i. e. the whole coolant amount enters the first deaeration section only.

After heating in the jet part 9 of the first deaeration section, the coolant condenses some of the steam and flows to the distribution tray 10 of the first deaeration section. Buckets 11 mounted on it serve to let the steam pass into the jet part 9, which is why their height should exceed the potential level of coolant and condensate on the distribution tray 10 of the first deaeration section.

Through the perforation of the distribution tray 10 of the first deaeration section, the coolant flows into the packing 12 with random elements where its final heating to the saturation state and degassing occurs. Random elements ensure the efficiency of degassing as the water spreads over their surface in a thin film, thus increasing the contact area between water and steam, meanwhile leaving a large free cross section between the elements (due to their randomness) to let the steam go through.

Then, the coolant and the condensate generated as a result of its heating flow through the second deaeration section to the tank 1 via the connection pipe 23 and further back to the circuit through the outlet fitting 7. The gases emitted from the coolant in the mixtures with some steam exit the deaerator through the partition 20 into the blowdown fitting 6.

When additional coolant flow (e.g., makeup) is supplied to the deaerator through the inlet fitting 5 and/or the flow rate through the inlet fitting 4 increases significantly, the entire coolant flow through the pressure tray 8 of the first deaeration section into the first section is discontinued. The level on the tray 8 starts to increase exceeding the height of the edge 18 of the hydraulic seal and the coolant starts to flow over to the pressure tray 13 of the second deaeration section.

Thus, higher coolant flow rates bring both deaeration sections to operation. The flow rate through the first deaeration section is determined by the height of the edge 18 of the hydraulic seal, the rest of the coolant flows to the tray 13 of the second deaeration section and then to the jet part 14, the distribution tray 15 and in the packing 17 with random elements.

The steam of the source 2 moves towards the coolant stream: to the first deaeration section through the pipe 23, and to the second deaeration section through the packing 17 of the second deaeration section, through the buckets 16 to the jet part 14. The steam passing through the connection pipe 23 flows to the first deaeration section only, while the steam passing through the second deaeration section heats up the coolant in the packing 17 and in the jet part 14. The gases emitted from the coolant passing through the first deaeration section exit to the blowdown fitting 6, while the gases emitted from the coolant passing through the second deaeration section from the volume of the jet part 14 exit to the blowdown fitting 22.

Therefore, the deaeration sections operate in parallel, which reduces the steam and water flow rates through the second section, provides unambiguous calculations, thus improving overall reliability of the calculations and operation of the deaerator.

INDUSTRIAL APPLICABILITY

The deaerator (options) can be applied in other systems with a wide range of variation in the flow rate of the coolant supplied for deaeration.

Each of the foregoing and various aspects, together with those set forth in the claims and described in connection with the embodiments of the deaerator summarized above or otherwise disclosed herein including the drawings may be combined as claim limitations for a device, apparatus, system, method of manufacture, and/or use.

Although the various inventive aspects are herein disclosed in the context of certain preferred embodiments, implementations, and examples, it should be understood by those skilled in the art that the present invention extends beyond the specifically disclosed embodiments to other alternative embodiments and/or uses of the invention and obvious modifications and equivalents thereof. In addition, while a number of variations of the various aspects have been shown and described in detail, other modifications, which are within their scope will be readily apparent to those of skill in the art based upon this disclosure. It should be also understood that the scope this disclosure includes the various combinations or sub-combinations of the specific features and aspects of the embodiments disclosed herein, such that the various features, modes of implementation, and aspects of the disclosed subject matter may be combined with or substituted for one another. Thus, it is intended that the scope of the present invention herein disclosed should not be limited by the particular disclosed embodiments or implementations described above.

The invention claimed is:

1. A deaerator comprising:
a tank with an outlet fitting and a steam source,
a deaerator column mounted on the tank,
wherein the deaerator column comprises a water inlet fitting and a vapor blowdown fitting, wherein the deaerator column further comprises lower and upper deaeration sections wherein the upper deaeration section comprises a first pressure tray and a first distribution tray and wherein the lower deaeration section comprises a second pressure tray and a second distribution tray, wherein the upper deaeration section comprises a first jet chamber formed in the area between the first pressure tray and the first distribution tray and wherein the lower deaeration section comprises a second jet chamber formed in the area between the second pressure tray and the second distribution tray, wherein the upper deaeration section comprises a first random element packing and wherein the lower deaeration section comprises a second random element packing,
wherein the upper and lower deaeration sections are separated by a hydraulic seal formed by the edge of the first pressure tray and a hydraulic seal projection connected to an upper wall of the deaerator column, wherein the water inlet fitting and the vapor blowdown fitting are located inside the hydraulic seal projection,
wherein the hydraulic seal projection has openings the lower edges of which are located higher than the upper edge of the hydraulic seal.

2. A deaerator comprising:
a tank with an outlet fitting and a steam source,
a deaerator column mounted on the tank
wherein the deaerator column comprises a water inlet fitting and a vapor blowdown fitting, wherein the deaerator column further comprises lower and upper deaeration sections wherein the upper deaeration section comprises a first pressure tray and a first distribution tray and wherein the lower deaeration section comprises a second pressure tray and a second distribution tray, wherein the upper deaeration section comprises a first jet chamber formed in the area between the first pressure tray and the first distribution tray and wherein the lower deaeration section comprises a second jet chamber formed in the area between the second pressure tray and the second distribution tray, wherein the upper deaeration section comprises a first random element packing and wherein the lower deaeration section comprises a second random element packing,
wherein the upper and lower deaeration sections are separated by a hydraulic seal formed by the edge of the first pressure tray and a hydraulic seal projection connected to an upper wall of the deaerator column, wherein the water inlet fitting and the vapor blowdown fitting are located inside the hydraulic seal projection and wherein a steam blowdown fitting is located outside of the hydraulic seal projection, wherein the hydraulic seal projection has openings the lower edges of which are located higher than the upper edge of the hydraulic seal.

3. A deaerator comprising:

a tank with an outlet fitting and a steam source, a deaerator column mounted on the tank, wherein the deaerator column comprises a water inlet fitting and a vapor blowdown fitting, wherein the deaerator column further comprises lower and upper deaeration sections wherein the upper deaeration section comprises a first pressure tray and a first distribution tray and wherein the lower deaeration section comprises a second pressure tray and a second distribution tray, wherein the upper deaeration section comprises a first jet chamber formed in the area between the first pressure tray and the first distribution tray and wherein the lower deaeration section comprises a second jet chamber formed in the area between the second pressure tray and the second distribution tray, wherein the upper deaeration section comprises a first random element packing and wherein the lower deaeration section comprises a second random element packing, wherein the upper deaeration section is connected directly to the tank by a connection pipe that runs through the lower deaeration section, wherein the upper and lower deaeration sections are separated by a hydraulic seal formed by the edge of the first pressure tray and a hydraulic seal projection connected to an upper wall of the deaerator column, wherein the water inlet fitting and the vapor blowdown fitting are located inside the hydraulic seal projection and wherein a steam blowdown fitting is located outside of the hydraulic seal projection, wherein the hydraulic seal projection has openings the lower edges of which are located higher than the upper edge of the hydraulic seal.

\* \* \* \* \*